Figures 1, 2, 3, 4:
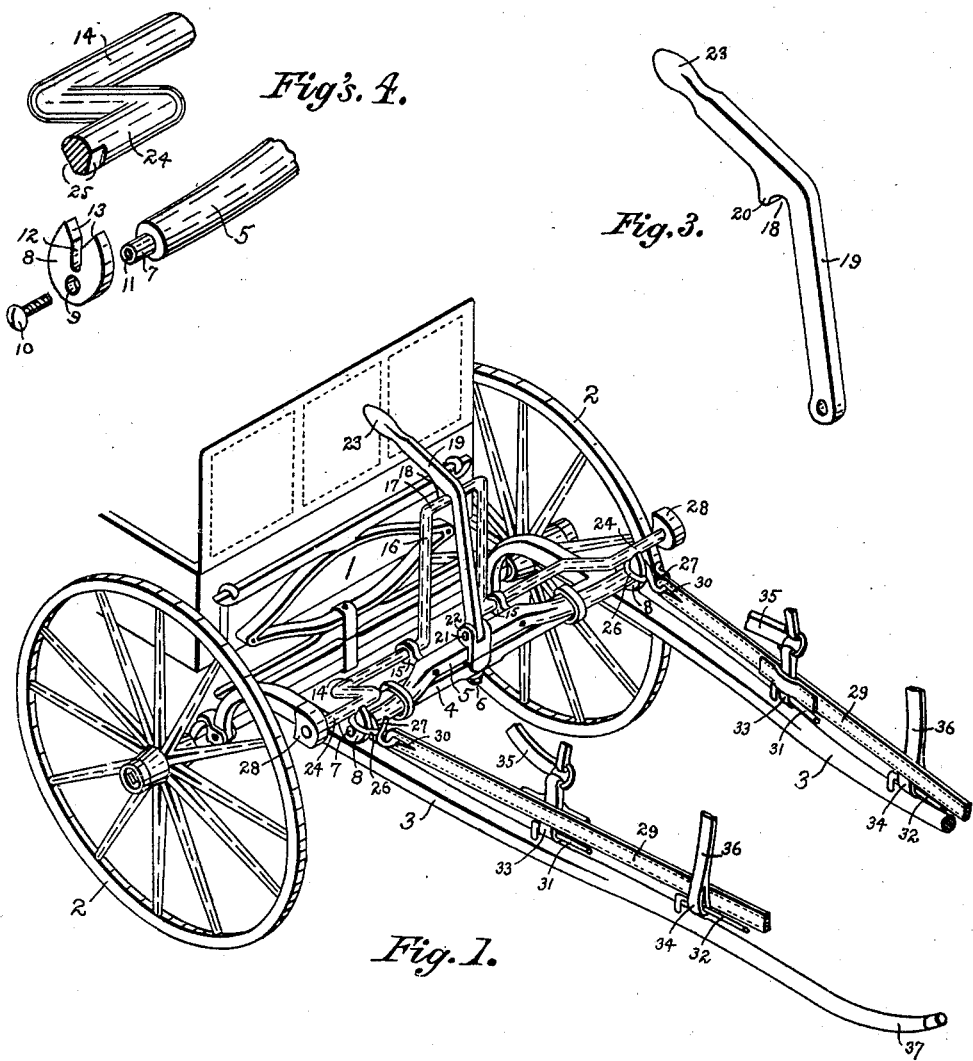

No. 660,592. Patented Oct. 30, 1900.
T. SANDERA.
HORSE DETACHER.
(Application filed Aug. 21, 1900.)
(No Model.)

Witnesses:
Martin Kenny.
Frank Sandera.

Inventor:
Theodore Sandera.
Per Harry Frease, Attorney

United States Patent Office.

THEODORE SANDERA, OF CANTON, OHIO.

HORSE-DETACHER.

SPECIFICATION forming part of Letters Patent No. 660,592, dated October 30, 1900.

Application filed August 21, 1900. Serial No. 27,556. (No model.)

*To all whom it may concern:*

Be it known that I, THEODORE SANDERA, a citizen of the United States, residing at No. 1627 Clark avenue, in the city of Canton, in the county of Stark and State of Ohio, have invented a new and useful Horse-Detacher, of which the following is a specification.

My invention relates to a device for detaching a horse from a vehicle and for stopping the vehicle thereafter to avoid accident when the horse becomes unmanageable, and has for its objects, first, to accomplish this by detaching the traces or tugs of the horse's harness from the singletree of the vehicle and the other parts of the harness from their respective shaft attachments, thus freeing the horse from the vehicle and all parts thereof, and, second, by stopping the vehicle by means of brake-blocks applied to the fore wheels thereof. I attain these objects by the mechanism illustrated in the accompanying drawings as applied to a vehicle with shafts, in which—

Figure 1 is an isometric view of the forward part of a vehicle, showing my device applied thereto; Fig. 2, a side elevation of the detaching and stopping mechanism; Fig. 3, a detached isometric view of the locking-lever, and Fig. 4 shows separate isometric views of the detaching parts in relative position for assembling.

Similar numerals refer to similar parts throughout the several views.

The vehicle 1, fore wheels 2, and shafts 3 are of ordinary form and construction. To the cross-bar 4 of the shafts is pivotally connected the singletree 5 by means of the ordinary bolt 6. From the ends of the singletree project the pins 7, on which are mounted the disks 8, the pins 7 passing through the holes 9 in said disks. The disks 8 may be retained on the pins 7 by the screws 10 turning into threaded apertures 11 in said pins or by any other suitable means as will allow a free rotation of said disks on the pins. In each disk 8 is provided the notch 12, the sides of which in the inner portion are substantially parallel with a line passing through the pivotal center; but in the outer portion said sides diverge from each other, forming the relatively-inclined faces 13.

To the rear side of the singletree 5 and parallel therewith is attached the shaft 14 by means of the eyebolts 15 or other suitable journal-bearings in which said shaft can be rotated. The shaft 14 is provided with an upward extension 16, the upper end 17 of which is adapted to engage the notch or recess 18 in the rear or under side of the locking-lever 19. The notch 18 is formed on one side by the projection 20 from the under side of said locking-lever 19. The forward and lower end of the locking-lever is pivotally attached to the singletree 5 by means of the pin or bolt 21 and the ears 22 or by other suitable means, and the rear upper end thereof terminates in a handle 23, extending rearward and upward to a point where it can be conveniently reached by an occupant of the vehicle. The outer ends of the shaft 14 are bent forward and slightly upward and thence directly outward, forming the crank extensions 24, so located as to enter and rest in the notches 12 when the disks 8 are rotated so said notches open upward, which is the normal position thereof. At the point of entering the notches 8 the crank extensions 24 may be shaped or gained so the faces 25 thereof will be in neat contact with the faces 13, respectively, of the disk-notches.

Before bringing the crank extensions 24 of the shaft into the notches 12 of the disks the loops or rings 26 of the trace-hooks 27 are placed in the said notches, respectively, and by bringing the crank extensions 24 into said notches above the trace-hook rings the same are held securely. The parts above described are so arranged that when the crank extensions 24 are engaged in the notches 12 the end 17 of the shaft extension 16 is engaged in the notch 18 on the rear under side of the locking-lever, which latter engagement is made by springing the extension 16 forward and bringing the locking-lever down with the projection 20 to the rear of the upper end 17 of said extension, thereby locking all parts in position, as described, which is the normal position thereof.

On the outer ends of the crank extensions 24, at a point in line with the fore wheels 2, respectively, are securely mounted the brake-blocks 28, which are adapted to engage the periphery of said fore wheels when the shaft 14 is rotated by a rearward and downward movement of the extension 16 thereof.

It will be understood that while separate trace-hooks 27, with rings 26, are described and illustrated the traces 29 may be supplied with rings at their ends which can be directly engaged in the notches 12 of the disks; but as this would necessitate an operation of the detaching mechanism at each separation of the horse from the vehicle I prefer to use the intermediate hook 27 and to attach the traces 29 thereto by the ordinary slots or holes 30 in the rear ends thereof, as illustrated.

On the upper sides of the vehicle-shafts 3 are attached the rods 31 and the relatively longer rods 32, each of which projects upward and thence forward, and the respective rods are adapted to receive over their forward ends the loops or eyes 33 and 34, attached to or forming part of the backing-strap 35 and the back-band 36, respectively, of the harness.

In use when it is desired to detach the horse from the vehicle, all parts being in the above-described normal position, an occupant of the vehicle need merely raise the locking-lever 19 by grasping and lifting its handle 23, which releases the upper end 17 of the extension 16 of the shaft 14 and allows said shaft to rotate. The tension of the traces 29, acting through the hook-rings 26 against the forward sides of the notches 12, will throw the crank extensions 24 up and out of said notches by action of the inclined rear faces 13 thereof against the inclined rear faces 25 of said crank extensions. The disks 8 being free to rotate will be turned by the same tension, bringing the notches 12 forward, thus disengaging the trace-hook rings 26. The loops 33 of the backing-straps and the loops 34 of the back-band will slip forward and successively off of the front free ends, respectively, of the rods 31 and 32, and the horse, with his harness, can move forward absolutely free from the vehicle, it being understood that the lines are dropped by the driver. An occupant of the vehicle can then stop the same by depressing to the rear the extension 16 of the shaft 14, thus rotating said shaft and bringing the brake-blocks 28 against the periphery of the fore wheels 2. In order to prevent damage and a too-sudden stop when the forward ends of the shafts 3 drop to the ground after the harness is disengaged, I prefer to use the style of shafts which have their forward ends curved up, as at 37, so the same will ride or slide over the ground or pavement.

Having described my invention, what I claim as new, and desire to secure by Letters Patent, is—

1. In combination, a singletree with notched disks pivotally attached to the ends thereof, trace-rings adapted to enter said notches, a shaft having journal attachment to said singletree, crank-shaped end extensions to said shaft adapted to enter and close said notches, and a locking-lever pivotally attached to said singletree having a recess to engage the end of a lateral extension from said shaft, substantially as specified.

2. In combination, vehicle fore wheels, a singletree, a shaft having journal attachment to said singletree, crank-shaped end extensions to said shaft having brake-blocks attached thereto, and a lateral extension from said shaft, substantially as specified.

3. In combination, a singletree with notched disks pivotally attached to the ends thereof, trace-rings adapted to enter said notches, a rocker-shaft having journal attachment to said shaft and crank-shaped end extensions adapted to engage and close said notches, with means for rotating and locking said shaft, substantially as specified.

In testimony whereof I have signed my name to this specification in the presence of two subscribing witnesses.

THEODORE SANDERA.

Witnesses:
 MARTIN KENNY,
 JOSEPH FREASE.